United States Patent [19]

Imoehl

[11] Patent Number: 4,944,269
[45] Date of Patent: Jul. 31, 1990

[54] ACCELERATING PEDAL FOR ELECTRONIC THROTTLE ACTUATION SYSTEM

[75] Inventor: William J. Imoehl, Williamsburg, Va.

[73] Assignee: Siemens-Bendix Automotive Electronics L.P., Troy, Mich.

[21] Appl. No.: 408,636

[22] Filed: Sep. 18, 1989

[51] Int. Cl.$^5$ .................. F02D 41/00; F02D 11/10
[52] U.S. Cl. .................. 123/399; 74/513; 251/129.13
[58] Field of Search .............. 123/361, 399; 251/129.11, 129.13; 74/513, 514; 310/77

[56] References Cited

U.S. PATENT DOCUMENTS

| 3,665,231 | 5/1972 | Wendler | 310/77 |
| 3,732,447 | 5/1973 | Perhats | 310/77 X |
| 4,601,271 | 7/1986 | Ejiri et al. | 123/399 X |
| 4,779,592 | 10/1988 | Takeuchi et al. | 123/399 |
| 4,850,319 | 7/1989 | Imoehl | 254/129.11 X |
| 4,850,322 | 7/1989 | Uthoff et al. | 123/399 |
| 4,869,220 | 9/1989 | Imoehl | 123/399 |

Primary Examiner—Willis R. Wolfe
Attorney, Agent, or Firm—George L. Boller; Russel C. Wells

[57] ABSTRACT

Improvements for imparting hysteresis, or dampening, to the shaft of a pedal assembly for an electronic throttle actuation system so that the feel of the pedal simulates the feel of a strictly mechanical system. Pads are resiliently urged against a disk in one embodiment, the disk being affixed to the pedal shaft. In another embodiment, metal rings are resiliently urged against friction rings on the disk.

12 Claims, 4 Drawing Sheets

ACCELERATING PEDAL FOR ELECTRONIC THROTTLE ACTUATION SYSTEM

REFERENCE TO A RELATED APPLICATION

Reference is made to the applicant's commonly assigned co-pending allowed application, Ser. No. 07/157,766 filed Feb. 18, 1988 and entitled, "Pedal Assembly For An Electronic Throttle Actuation System", now U.S. Pat. No. 4,869,220. The state of the art is represented by the references cited in that application.

BACKGROUND AND SUMMARY OF THE INVENTION

This invention relates to an accelerator pedal for an electronic throttle actuation system. More specifically, the invention relates to an improvement in creating hysteresis that acts on the pedal shaft so that the "feel" of pedal operation simulates that which exists in a pedal that is coupled to the throttle strictly by mechanical coupling systems.

In an electronic throttle actuation system for an automotive internal combustion engine, the position of the throttle blade is controlled by an actuator which receives an electrical signal from an electronic control unit. The electronic control unit in turn receives an input signal from a pedal assembly located in the occupant compartment of the vehicle and the system functions to cause the throttle blade to be under the control of the pedal assembly The pedal assembly comprises a transducer that provides to the electronic control unit a signal representative of the desired degree of throttle actuation. The assembly also comprises a return spring mechanism that urges the pedal to a position corresponding to the throttle blade being in a nearly closed, or idle, position. Depressing the pedal from this idle position rotates the pedal shaft against the spring, and in turn the electronic control unit supplies an appropriate signal to the actuator causing the throttle blade to be positioned to the extent commanded by the amount of depression of the pedal. In order for the pedal assembly to simulate the "feel" of throttle actuation systems that are strictly mechanical in nature, it is necessary for the pedal assembly that is used in the electronic throttle control system to comprise a friction means that imparts hysteresis, or dampening, to the pedal shaft. It is this feature that is the subject of the above-referenced patent application.

The present invention relates to improvements in a pedal assembly for an electronic throttle control system that are directed to the means for imparting hysteresis to the pedal shaft. In a first embodiment of the present invention, a disk is affixed to the pedal shaft and a pair of friction pads are disposed on opposite sides of the disk. The friction pads are urged resiliently against the opposite sides of the disk by means of a spring metal clip that contains the friction pads. In a second embodiment of the present invention, the friction elements are a pair of friction rings that are affixed to opposite faces of the disk. A pair of metal rings on opposite sides of the disk are resiliently urged against the friction rings. In both embodiments of the invention, rotation of the pedal shaft causes a frictional effect to be generated in resistance to the rotational motion of the pedal shaft. The "feel" of the pedal assembly is thereby caused to simulate the feel that is encountered in throttle actuation systems that utilize strictly mechanical coupling means between the pedal and the throttle blade.

The foregoing features, advantages and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

DESCRIPTION OF THE PREFERRED EMBODIMENT

Figure 1:
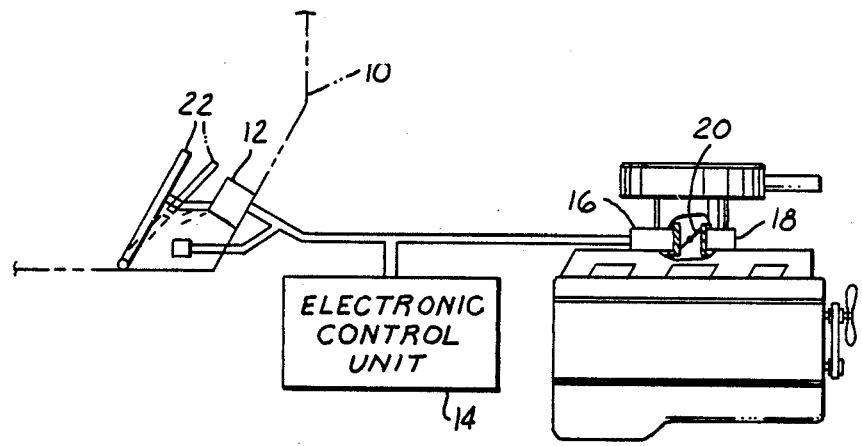
FIG. 1 is a schematic view illustrating an electronic throttle actuation system.

FIG. 1 illustrates schematically an electronic throttle control system of an automotive vehicle. The vehicle has a passenger compartment 10 which contains a foot pedal operated accelerator control apparatus 12 of the present invention. The system further includes an electronic control unit 14 and an actuator 16. Actuator 16 is mounted on a throttle assembly 18 of the engine and controls the position of the throttle blade 20 in accordance with the command of the control apparatus 12 as processed by electronic control unit 14. The pedal 22 that operates assembly 12 can pivot between the solid line and broken line positions shown in FIG. 1. The solid line position will command the throttle blade to assume a minimum opening position, while the broken line position of the pedal assembly will command a wide open throttle position. For each position of the pedal between these two extremes, the throttle blade is positioned in a corresponding position between its minimum and maximum openings.

Figure 2:
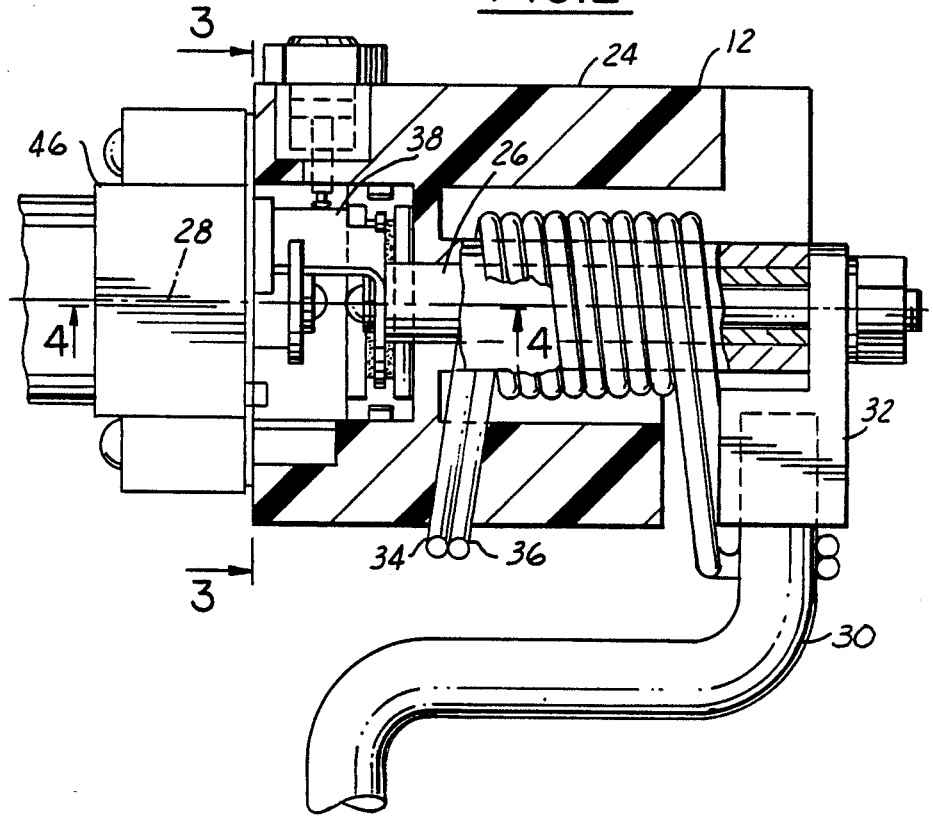
FIG. 2 is a plan view, partly in section, of a first embodiment of pedal assembly of the present invention.
Figure 3:
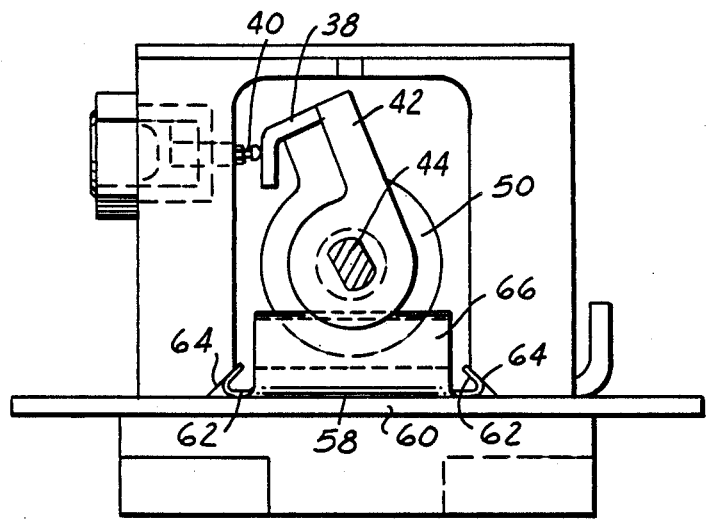
FIG. 3 is a transverse cross-sectional view looking in the direction of arrows 3—3 in FIG. 2.
Figure 4:
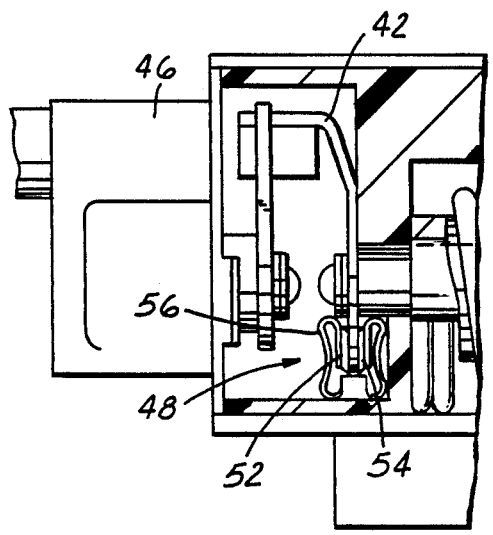
FIG. 4 is a fragmentary sectional view taken in the direction of arrows 4—4 in FIG. 2.

Details of assembly 12 are seen in FIGS. 2–4. Assembly 12 comprises a housing 24 that serves to mount a pedal shaft 26 for rotation about a horizontal axis 28. Pedal 22 includes a lever 30 that is connected to one end of shaft 26 by a coupling 32. A pair of torsion springs 34, 36 are arranged between housing 12 and lever 30 to rotationally bias the pedal to the solid line position shown in FIG. 1. It is this position that is depicted by FIGS. 2–4. In this position, a lever 38 at the end of shaft 26 opposite coupling 32 is biased in a counter-clockwise sense as viewed in FIG. 3 to make contact with the tip of an electrical switch 40. It also enables a lever 42 on the shaft 44 of a rotary transducer 46 to assume a maximum counter-clockwise position as in FIG. 3. Rotation of shaft 26 in a clockwise direction as viewed in FIG. 3 will be effective to break the contact between lever 38 and the tip of switch 40, and at the same time operate lever 42 in a clockwise sense.

Transducer 46 supplies an input signal to electronic control unit 14 which is representative of the amount of rotation of the switch shaft. Hence, as the lever 42 is rotated in the clockwise direction of FIG. 3, the signal output from transducer 46 to electronic control unit 14 similarly changes. The electronic control unit acts upon this signal to supply a corresponding signal to actuator 16 causing throttle blade 20 to be correspondingly positioned.

This much of assembly 12 that has just been described is essentially identical to similar portions of the assembly that is disclosed in the referenced patent application.

In order to impart hysteresis to the rotatable mechanism of assembly 12, a friction creating mechanism 48 is provided. Lever 38 is shaped to include a disk 50 that is concentric with axis 28. Acting upon opposite sides of disk 50, at the bottom of the disk, are a pair of friction pads 52, 54. These pads are resiliently urged against the opposite sides of the disk by means of a formed metal spring clip 56 to which the friction pads 52 and 54 are secured.

Clip 56 has a base 58 that is disposed against the lower wall 60 of housing 24. At the ends of base 58, the clip is formed with hook-shaped projections 62 that are adapted to fit within notches 64 in housing 24. The clip has sides 66 that project upwardly from base 58 and are then turned inwardly back toward themselves to support pads 52 and 54.

In its free condition, clip 56 will position pads 52 and 54 a distance from each other that is less than the thickness of disk 50. During manufacture of the apparatus, clip 56 is placed between wall 60 and housing 24 before the two parts 60, 24 are assembled. As the assembly is completed, the edge of disk 50 fits between pads 52 and 54, spreading the clip, and projections 62 lodge in notches 64. The clip is thereby accurately located on the housing and constrained against any rotational movement. As such, rotation of shaft 26 will cause disk 50 to ride between the pads while the pads exert a frictional force on the disk creating the desired hysteresis effect.

Figure 5:
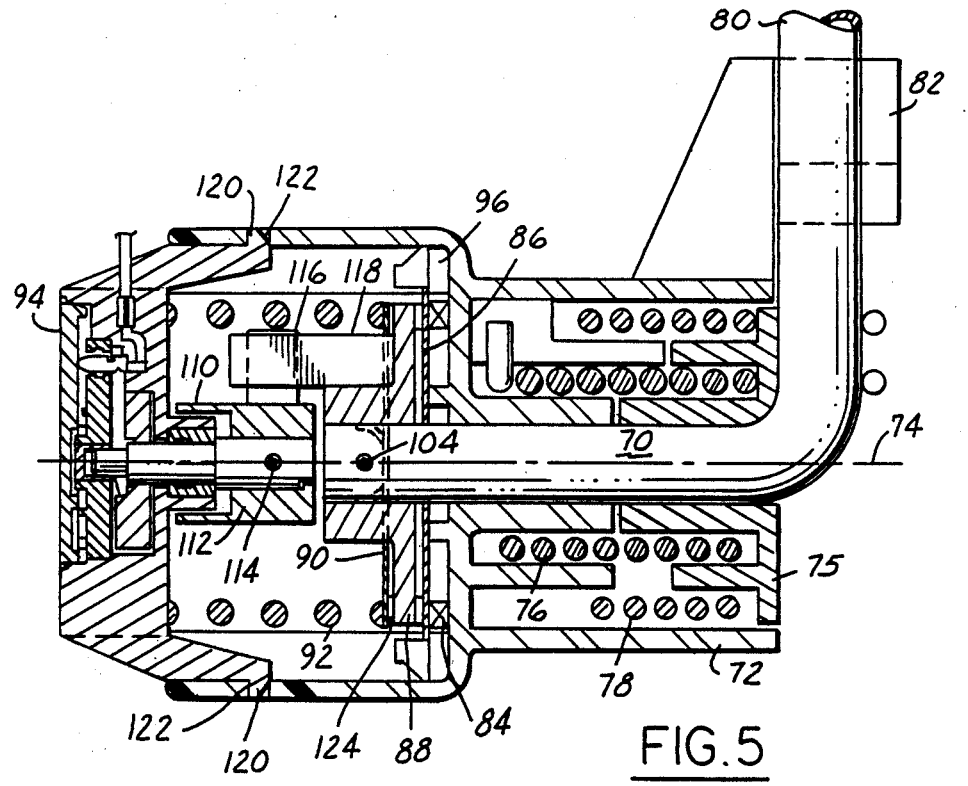
FIG. 5 is a cross-sectional view through a second embodiment of pedal assembly according to the present invention.
Figure 6:
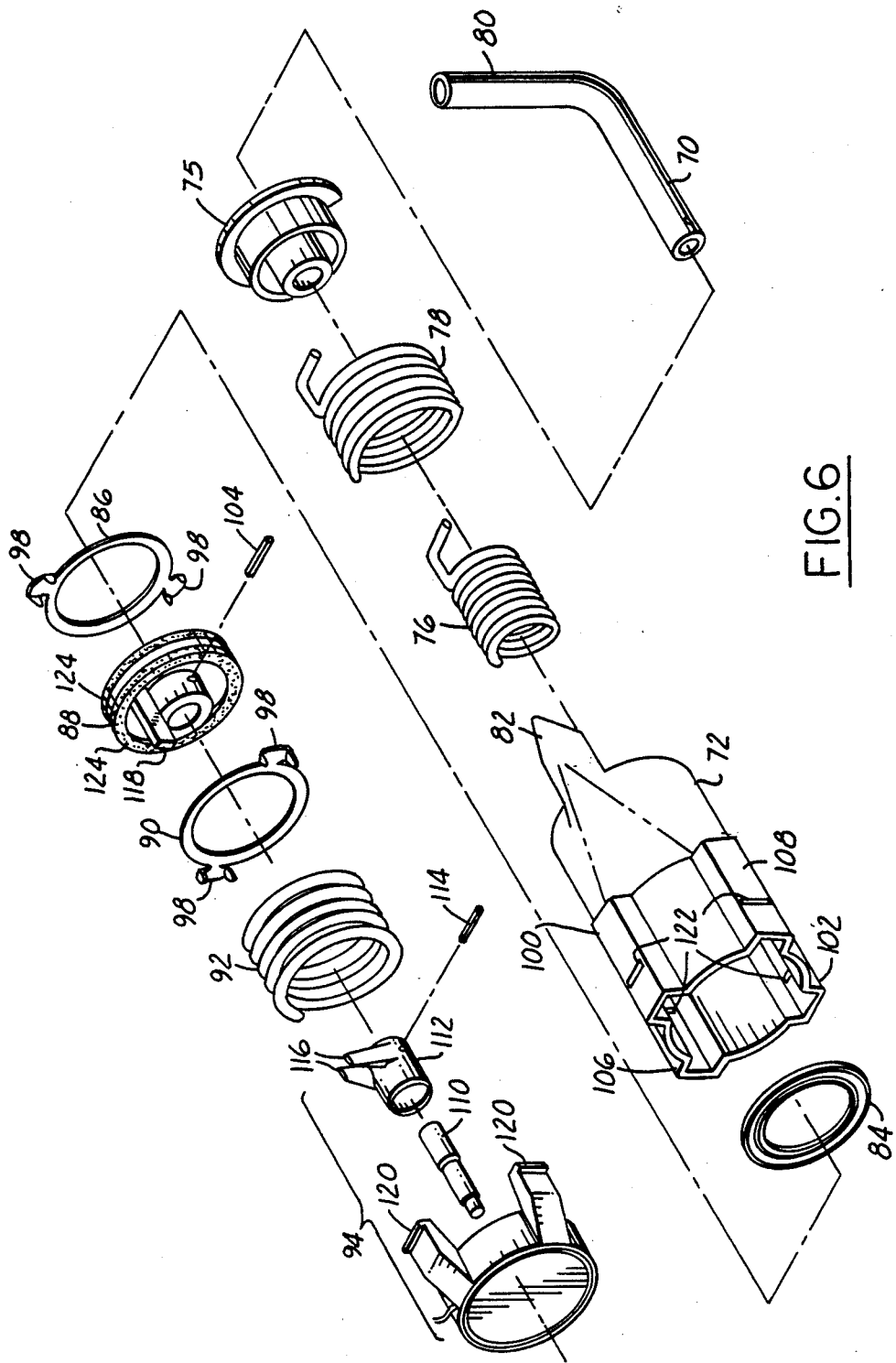
FIG. 6 is an exploded perspective view of the pedal assembly of FIG. 5.

The embodiment of FIGS. 5 and 6 comprises a shaft 70 that rotates within a housing 72 about an axis 74. Shaft 70 passes through a cap 75 that fits to the right-hand end of housing 72 as viewed in FIGS. 5 and 6. Cooperatively arranged within the right-hand portion of the housing, when the parts are assembled, are a pair of torsion springs 76, 78 that function in the same manner as the torsion springs of the first embodiment. In other words, they are arranged between the housing and the shaft to bias the shaft on the housing to a position corresponding to the solid line position of pedal 22 in FIG. 1. This position is defined by abutment of the lever arm portion 80 of shaft 70 with a stop 82 that is formed as an integral part of housing 72.

Assembled into housing 72 from the left-hand end as viewed in FIGS. 5 and 6, are a wave washer 84, a metal ring 86, a disk 88, another metal ring 90, a coil spring 92, and a transducer 94. After shaft 70, cap 75, and spring 76, 78 have been assembled into the right-hand end of housing 72, disk 88 can be assembled through the left-hand end of the housing and pinned to shaft 70. However, before assembly of the disk to the shaft, wave washer 84 and ring 86 are inserted. The interior of the housing is shaped with a means 96 to center wave washer 84. Ring 86 is formed with tabs 98 one hundred and eighty degrees apart and the left-hand end of housing 72 is provided with two channels 100, 102 through which tabs 98 pass. When the tabs 98 are disposed in the channels 100, 102, ring 86 is positioned concentric with axis 74 and is constrained against rotation. The wall of housing 72 can be provided with a suitable opening (not shown) providing access for pinning disk 88 to shaft 70 by means of a pin 104.

After pinning of disk 88 to shaft 70, ring 90, spring 92, and transducer assembly 94 are assembled to the housing. Ring 90 is identical to ring 86 comprising a pair of tabs 98 that fit into channels 106, 108 of housing 72, the four channels 100, 102, 106, 108, being arranged ninety degrees apart about axis 74.

Transducer 74 comprises an input shaft 110 to which a lever 112 is pinned by means of a pin 114. Lever 112 comprises a cylindrical sleeve that fits onto the outside end of shaft 110 and a pair of fingers 116 that project away from the cylindrical sleeve. In the assembled device, an axially projecting bar 118 of disk 88 fits between fingers 116 so that rotation of shaft 70, which rotates disk 88, in turn causes transducer input shaft 110 to be rotated. Transducer 94 assembles to housing 74 by means of barbs 120 that fit into channels 100, 102, 106, 108 and snap into slots 122 in the wall of each channel. Rotation of the transducer input shaft 110 by shaft 170, will cause the transducer to supply a corresponding electrical signal to the electronic control unit in the same manner as the transducer of the first embodiment.

Hysteresis is imparted to the rotation of shaft 70 within the device by virtue of the interaction of rings 86 and 90 with disk 88. As can be seen in FIG. 5, wave washer 84 and coil spring 92 serve to urge rings 86 and 90 against opposite sides of disk 88. Disk 88 is provided with friction rings 124 on opposite sides that wipe against rings 86 and 90 in response to rotation of shaft 70. Although the embodiment of FIGS. 5 and 6 does not incorporate a switch such as the switch 40 of the first embodiment, such a switch can be incorporated if desired.

While a preferred embodiment of the invention has been disclosed and described, it should be appreciated that principles are applicable to other embodiments.

What is claimed is:

1. In an accelerator pedal control apparatus that remotely controls the throttle valve of an internal combustion engine via electrical signals wherein the apparatus comprises a housing, a shaft journaled on the housing, for imparting rotational motion to the shaft, a spring rotationally biasing the shaft toward a first position corresponding to the throttle valve being in closed or substantially closed position, an electrical sensor that is operated by the rotation of said shaft to positions away from said first position to signal the amount of rotation that is being imparted to the shaft, and a friction mechanism that acts on the shaft to dampen shaft rotation, the improvement in said friction mechanism characterized by a disk affixed to said shaft, friction elements on opposite sides of said disk, a pair of formed metal elements acting to sandwich said friction elements and said disk, and resilient means urging said formed metal elements to forcefully sandwich said friction elements and said disk.

2. The improvement set forth in claim 1 in which said friction elements are a pair of pads that are secured to said formed metal elements, and said resilient means is integrally formed with said formed metal elements so that said formed metal elements and said resilient means are a single part.

3. The improvement set forth in claim 2 in which said single part is a formed metal clip having a base disposed on said housing and side portions at angles to said base, said side portions containing said pads.

4. The improvement set forth in claim 3 in which said side portions comprise sides that extend from said base and are inwardly reversed turning back onto themselves, said friction pads being disposed on the portions that are reverse-turned back onto themselves.

5. The improvement set forth in claim 1 in which said friction elements are a pair of circular rings on opposite sides of said disk and said formed metal elements are rings that are concentric with said friction elements.

6. The improvement set forth in claim 5 including keying means keying the rings to the housing.

7. The improvement set forth in claim 6 in which each metal ring comprises a pair of diametrically opposite tabs and said keying means comprises slots located in said housing within which said tabs are disposed.

8. The improvement set forth in claim 7 in which a different set of slots receives the tabs of one metal ring from the slots receiving the tabs of the other metal ring.

9. The improvement set forth in claim 5 in which said resilient means comprises a wave washer acting on one metal ring and a coil spring acting on the other metal ring.

10. The improvement set forth in claim 5 including a pair of fingers that project axially from the input shaft of said electrical sensor and a bar on said disk that projects axially to fit between the fingers of the electrical sensor input shaft for coupling rotation of the disk to the input shaft of the sensor.

11. The improvement set forth in claim 10 in which the sensor comprises barbs that snap into slots in the housing.

12. The improvement set forth in claim 9 including barbs on said sensor that are disposed within said slots and snap into apertures in the wall of said slots for mounting the sensor on the housing.

* * * * *